US012168239B2

(12) United States Patent
Baraggia Au Yeung et al.

(10) Patent No.: US 12,168,239 B2
(45) Date of Patent: Dec. 17, 2024

(54) AIR/OIL SEPARATOR APPARATUS AND METHOD

(71) Applicant: GE Avio S.r.l., Rivalta di Torino (IT)

(72) Inventors: Saypen Baraggia Au Yeung, Valenza (IT); Pietro Molesini, Castelnuovo del Garda (IT); Miriam Manzoni, Rivalta di Torino (IT); Fabio De Bellis, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/643,544

(22) Filed: Dec. 9, 2021

(65) Prior Publication Data
US 2022/0184641 A1 Jun. 16, 2022

(30) Foreign Application Priority Data

Dec. 10, 2020 (IT) .................. 102020000030401

(51) Int. Cl.
| | | |
|---|---|---|
| *B01D 45/16* | (2006.01) | |
| *B04C 5/04* | (2006.01) | |
| *B04C 5/28* | (2006.01) | |
| *F02C 7/06* | (2006.01) | |

(52) U.S. Cl.
CPC ............... *B04C 5/28* (2013.01); *B01D 45/16* (2013.01); *B04C 5/04* (2013.01); *F02C 7/06* (2013.01); *F05D 2220/32* (2013.01); *F05D 2260/98* (2013.01)

(58) Field of Classification Search
CPC .... B01D 47/05; B01D 45/10; B01D 2202/00; B01D 49/003
See application file for complete search history.

(56) References Cited

U.S. PATENT DOCUMENTS

| | | | | |
|---|---|---|---|---|
| 3,771,295 A | | 11/1973 | Wheeler, Jr. | |
| 3,893,922 A | * | 7/1975 | Bobo ...................... | B04C 3/06 |
| | | | | 210/512.2 |
| 3,940,331 A | * | 2/1976 | Rastatter .................. | B04C 5/14 |
| | | | | 209/733 |
| 5,049,171 A | | 9/1991 | Presnell et al. | |
| 6,279,556 B1 | * | 8/2001 | Busen ................... | F01M 13/04 |
| | | | | 123/573 |
| 6,334,234 B1 | * | 1/2002 | Conrad ................. | A47L 9/0009 |
| | | | | 15/350 |
| 7,361,200 B2 | * | 4/2008 | Oh ....................... | A47L 9/1625 |
| | | | | 55/459.1 |

(Continued)

FOREIGN PATENT DOCUMENTS

| | | | |
|---|---|---|---|
| CN | 101451467 A | 6/2009 | |
| CN | 110418879 A | 11/2019 | |

(Continued)

*Primary Examiner* — Dung H Bui
(74) *Attorney, Agent, or Firm* — Venable LLP; Peter T. Hrubiec; Michele V. Frank (57) ABSTRACT

An air/oil separator is provided. The air/oil separator includes an oil manifold having a first air/oil inlet and a second air/oil inlet; a first separation chamber in communication with the first air/oil inlet; and a second separation chamber separate from the first separation chamber, the second separation chamber in communication with the second air/oil inlet.

18 Claims, 4 Drawing Sheets

(56) References Cited

U.S. PATENT DOCUMENTS

| | | | |
|---|---|---|---|
| 7,556,662 B2* | 7/2009 | Lee | A47L 9/1666 15/353 |
| 7,563,298 B2* | 7/2009 | Oh | A47L 9/1641 55/459.1 |
| 7,744,667 B2* | 6/2010 | Oh | A47L 9/1641 55/459.1 |
| 7,867,310 B2 | 1/2011 | Baten | |
| 7,931,718 B2 | 4/2011 | Cheng | |
| 8,529,668 B2 | 9/2013 | Short et al. | |
| 9,649,000 B2* | 5/2017 | Jonsson | B01D 46/48 |
| 9,675,920 B2 | 6/2017 | Finn et al. | |
| 10,323,606 B2 | 6/2019 | Wilson et al. | |
| 2003/0221398 A1 | 12/2003 | Trautmann et al. | |
| 2004/0237484 A1* | 12/2004 | Altvater | F01M 13/023 55/345 |
| 2006/0090737 A1* | 5/2006 | Pietschner | F01M 13/04 55/DIG. 19 |
| 2006/0112941 A1* | 6/2006 | Hilpert | B04C 11/00 123/573 |
| 2006/0230721 A1* | 10/2006 | Oh | A47L 9/1625 55/345 |
| 2006/0254226 A1* | 11/2006 | Jeon | B04C 5/24 55/345 |
| 2009/0205162 A1* | 8/2009 | Oh | A47L 9/1683 55/343 |
| 2009/0229585 A1* | 9/2009 | Tanaka | F01M 13/04 123/573 |
| 2010/0187180 A1* | 7/2010 | Baten | B01D 45/08 60/39.08 |
| 2011/0120592 A1* | 5/2011 | Gabler | B01D 45/12 141/285 |
| 2015/0337697 A1* | 11/2015 | Kira | F01M 13/04 123/41.86 |
| 2016/0376950 A1* | 12/2016 | Kira | F01M 13/04 123/573 |
| 2018/0207651 A1 | 7/2018 | Meirav et al. | |
| 2018/0255993 A1 | 9/2018 | Kim et al. | |
| 2019/0015840 A1* | 1/2019 | Wulfert | B04C 5/28 |
| 2019/0224602 A1 | 7/2019 | Lin et al. | |
| 2019/0247785 A1 | 8/2019 | Gentry et al. | |

FOREIGN PATENT DOCUMENTS

| | | | |
|---|---|---|---|
| DE | 19912271 A1 | 9/2000 | |
| DE | 20302220 U1 | 6/2004 | |
| DE | 202004010550 U1 * | 12/2005 | F01M 13/02 |
| EP | 2871338 A1 | 5/2015 | |
| NL | 8602941 A | 6/1988 | |

* cited by examiner

AIR/OIL SEPARATOR APPARATUS AND METHOD

CROSS REFERENCE TO RELATED APPLICATIONS

The present application claims the benefit of Italian Patent Application No. 102020000030401, filed on Dec. 10, 2020, which is hereby incorporated by reference herein in its entirety.

FIELD

The present subject matter relates generally to a jet engine, or more particularly to an air/oil separator for a jet engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Mechanical and electro-mechanical systems, such as gas turbine engines or other engines, include gear assemblies to change an input or output rotational speed between two or more shafts such as to optimize turbine engine efficiency and performance. Gear assemblies are also used to move accessories and/or propellers or rotors. For example, gear assemblies are used to decouple turbine and fan shafts in turbofan engines and are used to decouple a gas turbine from a propeller in turboprop engines.

Lubricant systems for such gear assemblies are designed to supply lubricant injected into gear meshes. Such lubricant systems are able to lubricate both gear assemblies and turbomachinery shaft bearings or engine shafts. Lubricant, such as oil, is scavenged from a sump or a gearbox. Such oil may have quantities of air because of the mixing process induced by the rotation of the gears and bearings. Before returning the oil to a tank the air and oil must be separated from one another.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes an oil circuit for providing oil to a system of the gas turbine engine and an air/oil separator coupled to the oil circuit. The air/oil separator includes an oil manifold having a first air/oil inlet and a second air/oil inlet; a first separation chamber in communication with the first air/oil inlet; and a second separation chamber separate from the first separation chamber, the second separation chamber in communication with the second air/oil inlet.

In certain exemplary embodiments the air/oil separator includes an air manifold having an air outlet, the first separation chamber is in communication with the air outlet, and the second separation chamber is in communication with the air outlet.

In certain exemplary embodiments the first air/oil inlet is disposed tangentially along a wall of the first separation chamber and configured to receive a first air/oil mixture and induce a circular motion of the first air/oil mixture within the first separation chamber.

In certain exemplary embodiments a first oil portion exits the first separation chamber at a bottom location and a first air portion exits the first separation chamber at a top location and flows to the air outlet of the air manifold.

In certain exemplary embodiments the oil circuit provides the oil to at least one of a power gear box, a pitch change mechanism for a variable pitch fan, and an electric machine.

In certain exemplary embodiments the second air/oil inlet is disposed tangentially along a wall of the second separation chamber and configured to receive a second air/oil mixture and induce a circular motion of the second air/oil mixture within the second separation chamber.

In certain exemplary embodiments a second oil portion exits the second separation chamber at a bottom location.

In certain exemplary embodiments a second air portion exits the second separation chamber at a top location and flows to the air outlet of the air manifold.

In certain exemplary embodiments the air/oil separator includes a third separation chamber separate from the first separation chamber and the second separation chamber.

In certain exemplary embodiments the oil manifold includes a third air/oil inlet, and the third separation chamber is in communication with the third air/oil inlet.

In certain exemplary embodiments the third separation chamber is in communication with the air outlet.

In certain exemplary embodiments the third air/oil inlet is disposed tangentially along a wall of the third separation chamber and configured to receive a third air/oil mixture and induce a circular motion of the third air/oil mixture within the third separation chamber.

In another exemplary embodiment of the present disclosure, a gas turbine engine is provided. The gas turbine engine includes an oil circuit for providing oil to a system of the gas turbine engine and an air/oil separator coupled to the oil circuit. The air/oil separator includes an air manifold having an air outlet, a first separation chamber in communication with the air outlet; and a second separation chamber separate from the first separation chamber, the second separation chamber in communication with the air outlet.

In certain exemplary embodiments the air/oil separator includes an oil manifold having a first air/oil inlet and a second air/oil inlet; the first separation chamber is in communication with the first air/oil inlet; and the second separation chamber is in communication with the second air/oil inlet.

In certain exemplary embodiments the first air/oil inlet is disposed tangentially along a wall of the first separation chamber and configured to receive a first air/oil mixture and induce a circular motion of the first air/oil mixture within the first separation chamber.

In certain exemplary embodiments a first oil portion exits the first separation chamber at a bottom location, and wherein a first air portion exits the first separation chamber at a top location and flows to the air outlet of the air manifold.

In certain exemplary embodiments the second air/oil inlet is disposed tangentially along a wall of the second separation chamber and configured to receive a second air/oil mixture and induce a circular motion of the second air/oil mixture within the second separation chamber, wherein a second oil portion exits the second separation chamber at a bottom location, and wherein a second air portion exits the second separation chamber at a top location and flows to the air outlet of the air manifold.

In an exemplary aspect of the present disclosure, a method is provided for separating oil from air in a gas turbine engine. The method includes providing an air/oil separator having a first separation chamber and a second separation chamber separate from the first separation chamber; directing a first air/oil mixture to the first separation chamber; and simultaneously directing a second air/oil mixture to the second separation chamber.

In certain exemplary aspects a first air/oil inlet is disposed tangentially along a wall of the first separation chamber and configured to receive the first air/oil mixture and induce a circular motion of the first air/oil mixture within the first separation chamber, wherein a first oil portion exits the first separation chamber at a bottom location, and wherein a first air portion exits the first separation chamber at a top location.

In certain exemplary aspects a second air/oil inlet is disposed tangentially along a wall of the second separation chamber and configured to receive the second air/oil mixture and induce a circular motion of the second air/oil mixture within the second separation chamber, wherein a second oil portion exits the second separation chamber at a bottom location, and wherein a second air portion exits the second separation chamber at a top location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

An air/oil separator of the present disclosure includes multiple separation chambers which allows for an increased separation capacity with a reduction in volume of the air/oil separator. For example, an air/oil separator of the present disclosure provides for improved air/oil separation due to a reduction of separation chamber radius with respect to conventional separators that include a single larger chamber. With a reduction of the separation chamber radius in an air/oil separator of the present disclosure, the centrifugal forces within each respective separation chamber of the present disclosure is increased. In this manner, an air/oil separator of the present disclosure results in improved air and oil quality and reduction of oil consumption.

It is contemplated that an air/oil separator of the present disclosure may include any number of multiple separation chambers for a desired application corresponding to a particular type of engine. For example, different types of engines have different sizes which may provide less space for an air/oil separator to occupy. Thus, an air/oil separator of the present disclosure allows for a design that can be adaptable to any of the different engine sizes by regulating the number of separation chambers within the air/oil separator. The number of separation chambers within the air/oil separator can also be adjusted depending on the amount of air/oil mixture of a specific engine.

An air/oil separator of the present disclosure is compatible with lubricant systems that are able to lubricate both gear assemblies and turbomachinery shaft bearings or engine shafts. For example, an air/oil separator of the present disclosure is compatible with gear assembly lubrication systems and turbine engine lubrication systems.

Figure 1:
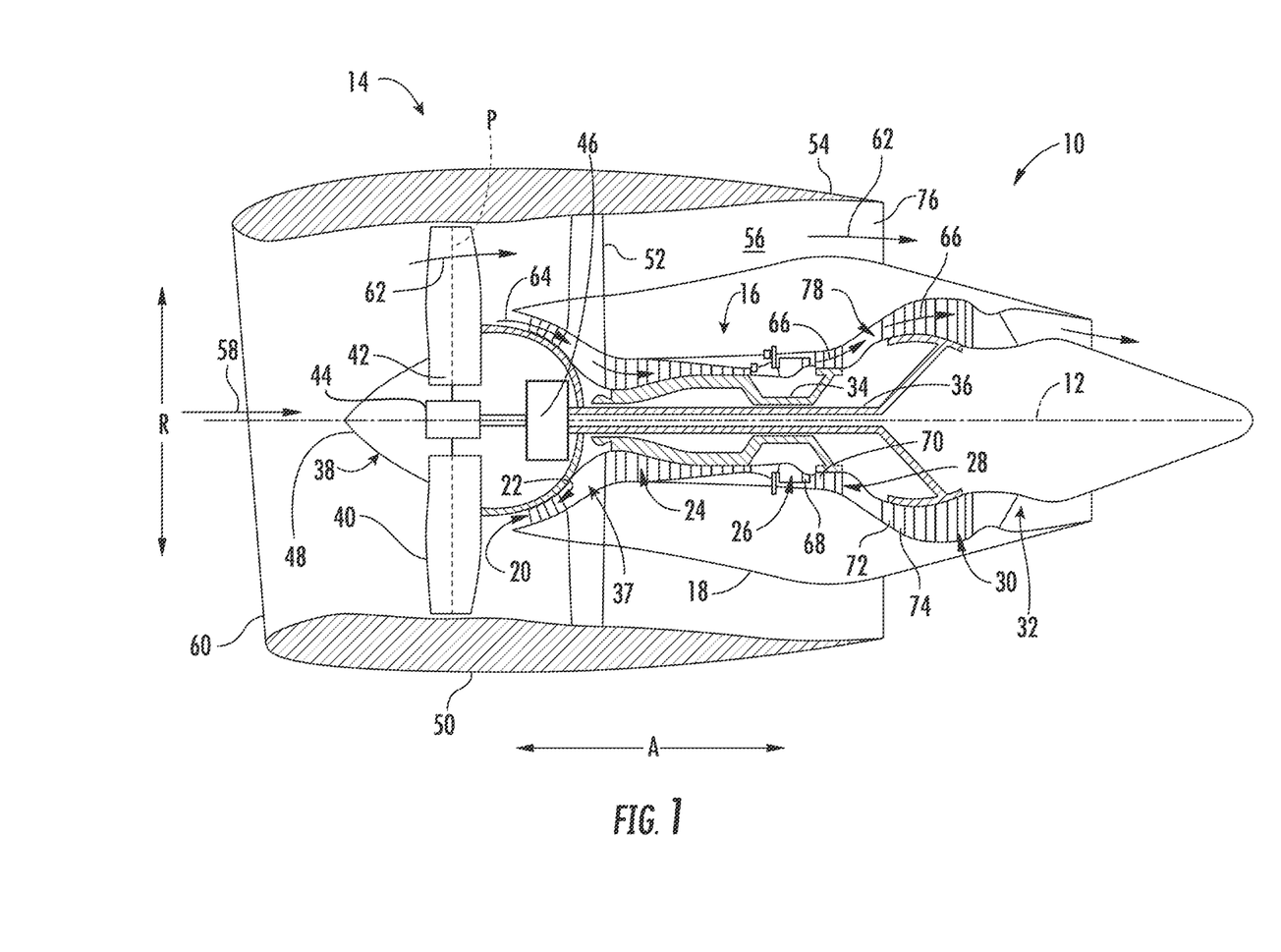
FIG. 1 is a schematic, cross-sectional view of an exemplary gas turbine engine in accordance with exemplary embodiments of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." Although FIG. 1 illustrates a turbofan configuration, a gear assembly of the present disclosure is compatible with other configurations, such as a turboprop or other configurations, as described below. As shown in FIG. 1, the turbofan engine 10 defines an axial direction A (extending parallel to a longitudinal centerline 12 provided for reference) and a radial direction R. In general, the turbofan 10 includes a fan section 14 and a turbomachine 16 disposed downstream from the fan section 14. In an exemplary embodiment, the engine 10 includes a gear assembly or power gear box 46 having a plurality of gears for decoupling a gas turbine shaft from a fan shaft. The position of the power gear box 46 is not limited to that as shown in the exemplary embodiment of turbofan 10. For example, the position of the power gear box 46 may vary along the axial direction A.

In other exemplary embodiments, a gear assembly of the present disclosure may be included in a turboprop configuration, wherein a gear box decouples a gas turbine from a propeller.

It is also contemplated that a gear assembly of the present disclosure is able to be utilized in any mechanical or electro-mechanical system, such as gas turbine engines, piston engines, turbofan engines, turboprop engines, other gear drive systems, and/or rotor drive systems.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Other embodiments may feature different turbomachine configurations. For example, an LP turbine that is not directly connected to an LP compressor, e.g., in a decoupling gear box configuration. Additionally, the compressor section, combustion section 26, and turbine section together define at least in part a core air flowpath 37 extending therethrough.

A gear assembly of the present disclosure is compatible with standard fans, variable pitch fans, or other configurations. For the embodiment depicted, the fan section 14 may include a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a gear assembly or power gear box 46. A gear assembly 46 may enable a speed change between a first shaft, e.g., LP shaft 36, and a second shaft, e.g., LP compressor shaft and/or fan shaft. For example, in one embodiment, the gear assembly 46 may be disposed in an arrangement between a first shaft and a second shaft such as to reduce an output speed from one shaft to another shaft.

More generally, the gear assembly 46 can be placed anywhere along the axial direction A to decouple the speed of two shafts, whenever it is convenient to do so from a component efficiency point of view, e.g., faster LP turbine and slower fan and LP compressor or faster LP turbine and LP compressor and slower fan, or it is required to do so due to technology limits, e.g., propeller tip speed in turboprops require much lower speed with respect to gas turbine shafts speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, an engine of the present disclosure may be part of an airplane engine or a helicopter engine. In other exemplary embodiments, any other suitable engine may be utilized with a gear assembly of the present disclosure. For example, in other embodiments, the engine may be any other suitable gas turbine engine, such as a turbofan engine, turboprop engine, turbojet engine, any other suitable turboshaft engine, etc. In such a manner, it will further be appreciated that in other embodiments the gas turbine engine may have any other suitable configuration, such as any other suitable number or arrangement of shafts, compressors, turbines, fans, etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of combustion engine, such as reciprocating engines.

Figure 2:
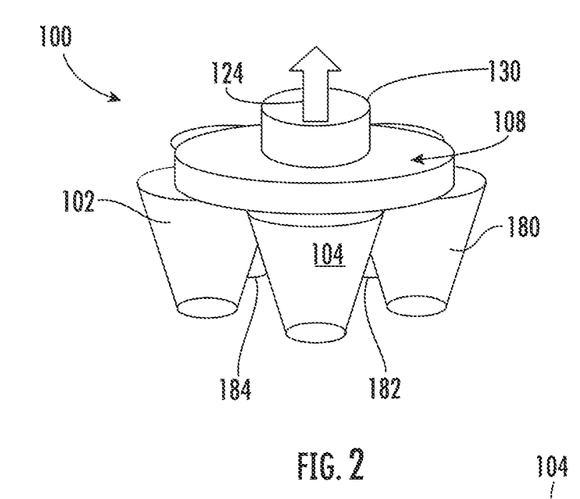
FIG. 2 is a perspective view of an air/oil separator of a gas turbine engine in accordance with an exemplary embodiment of the present disclosure.
Figure 3:
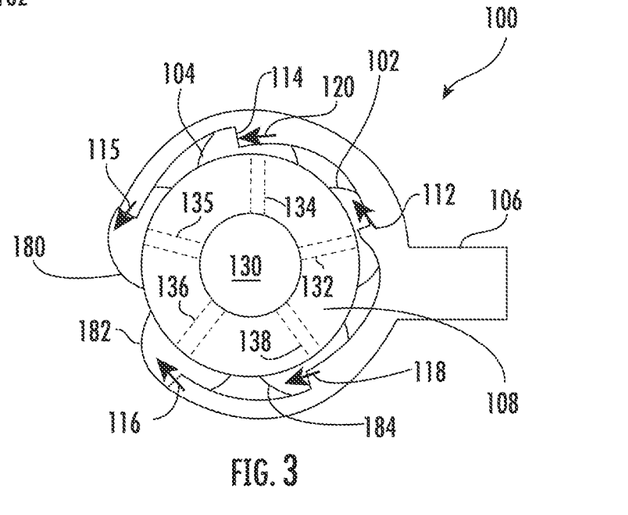
FIG. 3 is a top elevation view of an air/oil separator of a gas turbine engine in accordance with an exemplary embodiment of the present disclosure.

FIGS. 2-7 illustrate exemplary embodiments of the present disclosure. Referring now to FIGS. 2-3, an air/oil separator 100 for a gas turbine engine 10 is provided. In exemplary embodiments, the gas turbine engine 10 includes an oil circuit for providing oil to a system of the gas turbine engine 10 and the air/oil separator 100 is coupled to the oil circuit. In exemplary embodiments, the oil circuit of the gas turbine engine 10 provides the oil to at least one of a power gear box, a pitch change mechanism for a variable pitch fan, an electric machine, or other system of the gas turbine engine 10. In exemplary embodiments, an air/oil separator 100 of the present disclosure is for a gear assembly 46, or for an engine lubrication system of engine 10, for an aeronautical engine, e.g., a gas turbine engine, in accordance with exemplary embodiments of the present disclosure is provided. In at least certain exemplary embodiments, the exemplary air/oil separator 100 depicted in FIGS. 2-3 may be incorporated into, e.g., the exemplary engine 10 described above with reference to FIG. 1 (e.g., may be incorporated into the gear assembly 46 depicted in FIG. 1 and described above, or in other positions along the axial direction A depending on the turbofan engine architecture, or in other configurations such as turboprop engines, or other gear drive systems).

An air/oil separator 100 of the present disclosure is compatible with lubricant systems that are able to lubricate both gear assemblies and turbomachinery shaft bearings or engine shafts. For example, an air/oil separator 100 of the present disclosure is compatible with gear assembly lubrication systems and turbine engine lubrication systems.

Referring to FIGS. 2-3, in an exemplary embodiment, an air/oil separator 100 of the present disclosure generally includes a first separation chamber 102, a second separation chamber 104, an oil manifold 106, and an air manifold 108. The air/oil separator 100 of the present disclosure having multiple separation chambers 102, 104 allows for an increased separation capacity with a reduction in volume of the air/oil separator 100.

It is contemplated the air/oil separator 100 of the present disclosure may include any number of multiple separation chambers for a desired application corresponding to a particular type of engine. For example, different types of engines have different sizes which may provide less space for the air/oil separator 100 to occupy. Thus, the air/oil separator 100 of the present disclosure allows for a design that can be adaptable to any of the different engine sizes by regulating the number of separation chambers within the air/oil separator 100. The number of separation chambers within the air/oil separator 100 can also be adjusted depending on the amount of air/oil mixture of a specific engine.

The air/oil separator 100 of the present disclosure provides for improved air/oil separation due to a reduction of separation chamber radius with respect to conventional separators that include a single larger chamber. With a reduction of the separation chamber radius in an air/oil separator 100 of the present disclosure, the centrifugal forces within each respective separation chamber of the present disclosure is increased. In this manner, the air/oil separator 100 of the present disclosure results in improved air and oil quality and reduction of oil consumption.

Referring to FIGS. 2-3, in one exemplary embodiment, the air/oil separator 100 includes a first separation chamber 102, a second separation chamber 104, a third separation chamber 180, a fourth separation chamber 182, and a fifth separation chamber 184. Each of these separation chambers 102, 104, 180, 182, 184 are separate and apart from each other.

Figure 6:
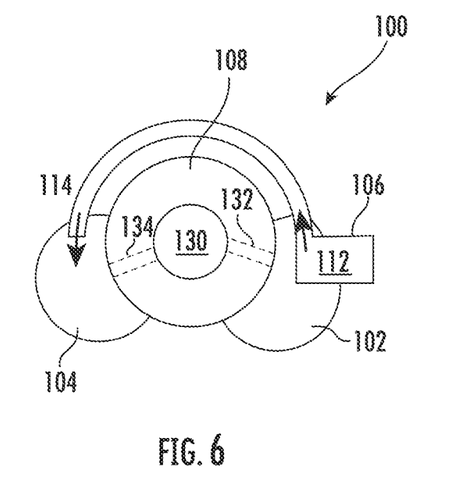
FIG. 6 is a top elevation view of an air/oil separator of a gas turbine engine in accordance with another exemplary embodiment of the present disclosure.

Referring to FIG. 6, in another exemplary embodiment, the air/oil separator 100 includes a first separation chamber 102 and a second separation chamber 104.

Figure 7:
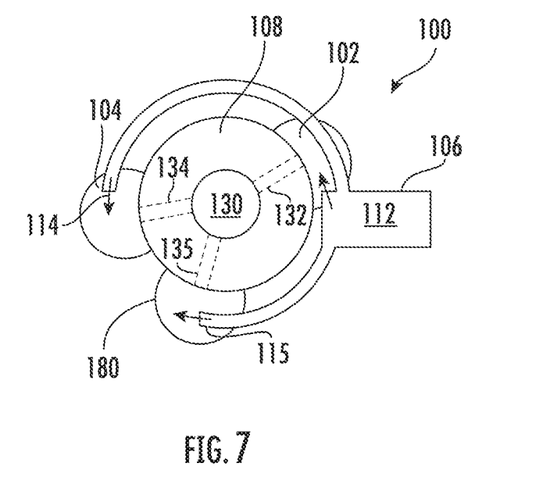
FIG. 7 is a top elevation view of an air/oil separator of a gas turbine engine in accordance with another exemplary embodiment of the present disclosure.

Referring to FIG. 7, in another exemplary embodiment, the air/oil separator 100 includes a first separation chamber 102, a second separation chamber 104, and a third separation chamber 180.

It is contemplated that the separation chambers 102, 104, 180, 182, 184 of the present disclosure may have a conical shape, a cylindrical shape, or any other geometric shape to facilitate the air and oil separation described herein.

Referring to FIGS. 2 and 3, the oil manifold 106 of the present disclosure includes a corresponding number of air/oil inlets 112 as the number of separation chambers within the air/oil separator 100. The oil manifold 106 of the present disclosure is able to feed an air/oil mixture 120 to each of the multiple separation chambers of the air/oil separator 100. In this manner, each separation chamber within the air/oil separator 100 has direct access to receive an air/oil mixture 120 from the oil manifold 106. Furthermore, such a configuration allows for each separation chamber within the air/oil separator 100 to simultaneously receive an air/oil mixture 120 from the oil manifold 106.

Referring to FIGS. 2-3, in one exemplary embodiment, the oil manifold 106 of the present disclosure includes a first air/oil inlet 112, a second air/oil inlet 114, a third air/oil inlet 115, a fourth air/oil inlet 116, and a fifth air/oil inlet 118. In this manner, as shown in FIG. 3, the first separation chamber 102 is in communication with the first air/oil inlet 112, the second separation chamber 104 is in communication with the second air/oil inlet 114, the third separation chamber 180 is in communication with the third air/oil inlet 115, the fourth separation chamber 182 is in communication with the fourth air/oil inlet 116, and the fifth separation chamber 184 is in communication with the fifth air/oil inlet 118.

In one exemplary embodiment, an oil manifold 106 of the present disclosure is formed using precision casting, advanced machining, or other traditional manufacturing machines or methods. In one exemplary embodiment, an oil manifold 106 of the present disclosure is formed using additive manufacturing machines or methods. As described in detail below, exemplary embodiments of the formation of an oil manifold 106 involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming an oil manifold 106 of the present disclosure using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single integral oil manifold 106 to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of an oil manifold 106 of the present disclosure. Accordingly, a three-dimensional design model of the component may be defined prior to manufacturing. In this regard, a model or prototype of the component may be scanned to determine the three-dimensional information of the component. As another example, a model of an oil manifold 106 of the present disclosure may be constructed using a suitable computer aided design (CAD) program to define the three-dimensional design model of the component.

The design model may include 3D numeric coordinates of the entire configuration of an oil manifold 106 of the present disclosure including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, an oil manifold 106 of the present disclosure described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of an oil manifold 106 of the present disclosure may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of an oil manifold 106 of the present disclosure is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

While the present disclosure is not limited to the use of additive manufacturing to form an oil manifold 106 of the present disclosure generally, additive manufacturing does provide a variety of manufacturing advantages, including ease of manufacturing, reduced cost, greater accuracy, etc.

Also, the additive manufacturing methods described above enable much more complex and intricate shapes and contours of an oil manifold 106 described herein to be formed with a very high level of precision. For example, such components may include thin additively manufactured layers, cross sectional features, and component contours. In addition, the additive manufacturing process enables the manufacture of a single integral oil manifold 106 having different materials such that different portions of the component may exhibit different performance characteristics. The successive, additive nature of the manufacturing process enables the construction of these novel features. As a result, an oil manifold 106 of the present disclosure formed using the methods described herein may exhibit improved performance and reliability.

Referring to FIGS. 2 and 3, the air manifold 108 of the present disclosure includes an air outlet 130. The air manifold 108 is in communication with each of the separation chambers within the air/oil separator 100. In this manner, as shown in FIG. 3, the first separation chamber 102 is in communication with the air outlet 130 via a first air channel 132, the second separation chamber 104 is in communication with the air outlet 130 via a second air channel 134, the third separation chamber 180 is in communication with the air outlet 130 via a third air channel 135, the fourth separation chamber 182 is in communication with the air outlet 130 via a fourth air channel 136, and the fifth separation chamber 184 is in communication with the air outlet 130 via a fifth air channel 138. In this manner, the air manifold 108 of the present disclosure is able to collect air discharge from each of the separation chambers and exit the collected air from each of the separation chambers out the air outlet 130. An air manifold 108 of the present disclosure improves the quality of the air 124 that may be discharged into a sump containing a rotating separator or breather. In this manner, an air manifold 108 of the present disclosure improves the oil quality, e.g., a low amount of air entrained into lubricant oil.

The separation chambers of the present disclosure each provide a chamber for separating an oil portion from an air portion of the air/oil mixture. For example, each of the air/oil inlets 112, 114, 115, 116, 118 of the oil manifold 106 are disposed tangentially along a wall of the respective separation chamber 102, 104, 180, 182, 184 and are configured to receive a portion of the air/oil mixture 120 and induce a circular motion of the air/oil mixture 120 within each of the respective separation chambers 102, 104, 180, 182, 184. In this manner, a centrifugal force is provided in each of the separation chambers 102, 104, 180, 182, 184 and the separation chambers 102, 104, 180, 182, 184 are configured to induce a rotation of an air/oil mixture 120 to guide the heavier oil 122 toward an oil outlet 140 and guide the lighter air toward an air outlet, e.g., a respective air channel 132, 134, 135, 136, 138 of each of the respective separation chambers 102, 104, 180, 182, 184. The air/oil separator 100 of the present disclosure provides separation chambers that quickly and efficiently remove and separate the majority of the oil 122 and the air 124 from the air/oil mixture 120.

As described above, the separation chambers 102, 104, 180, 182, 184 are configured to induce a rotation of an air/oil mixture 120 to guide the heavier oil 122 toward an oil outlet 140. For example, the respective oil portions 122 exit the separation chambers 102, 104, 180, 182, 184 to a respective oil outlet 140 and to an oil tank 142. For example, referring to FIG. 5, each of the separation chambers 102, 104, 180, 182, 184 are in communication with the oil tank 142 via a respective oil outlet channel 140. The separated oil 122 is returned to the oil tank 142 at a high oil quality and can be delivered back to the main system via a delivery pump. The air/oil separator 100 of the present disclosure is able to improve the quality of the oil that is returned to the tank 142 which enables positive impacts on delivery pump performance.

It is contemplated that the respective oil portions 122 may exit the separation chambers 102, 104, 180, 182, 184 in different manners. For example, in a first exemplary embodiment, referring to FIG. 4A, the separated oil 122 may exit a separation chamber 102, 104, 180, 182, 184 through a bottom exiting hole 144 at a bottom location of the separation chamber 102, 104, 180, 182, 184. The bottom exiting hole 144 of each separation chamber 102, 104, 180, 182, 184 is in fluid communication with each of the respective oil outlets 140 and with the oil tank 142.

Figure 4A:
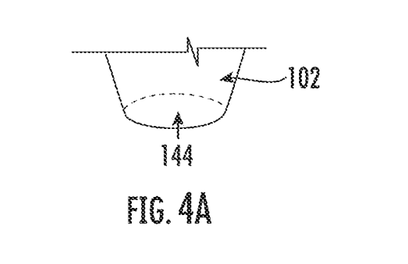
FIG. 4A is a perspective view of an oil exit portion of an air/oil separator of a gas turbine engine in accordance with an exemplary embodiment of the present disclosure.
Figure 4B:
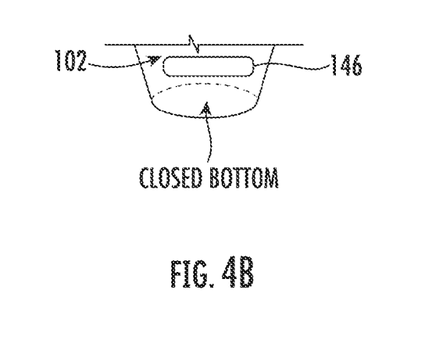
FIG. 4B is a perspective view of an oil exit portion of an air/oil separator of a gas turbine engine in accordance with another exemplary embodiment of the present disclosure.
Figure 5:
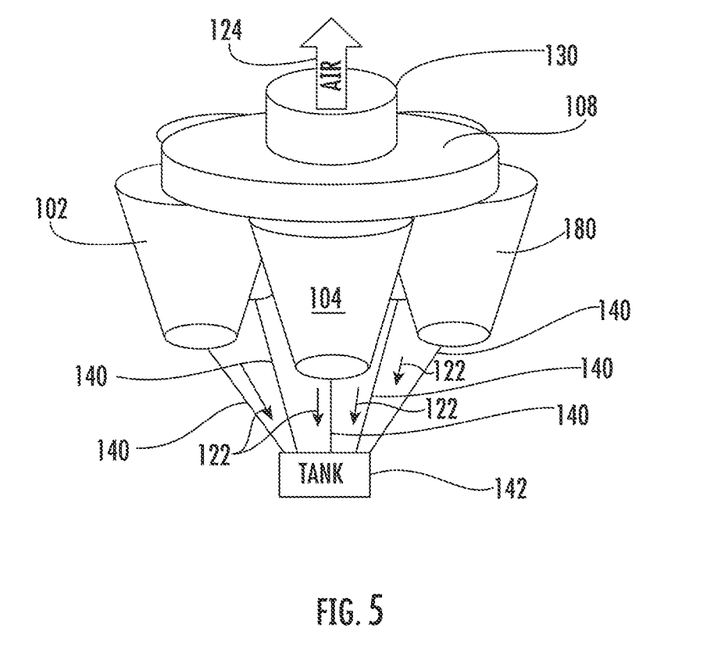
FIG. 5 is a perspective view of an air/oil separator of a gas turbine engine in accordance with an exemplary embodiment of the present disclosure.

In a second exemplary embodiment, referring to FIG. 4B, the separated oil 122 may exit a separation chamber 102, 104, 180, 182, 184 through a lateral exiting hole 146 at a lateral surface of the separation chamber 102, 104, 180, 182, 184. The lateral exiting hole 146 of each separation chamber 102, 104, 180, 182, 184 is in fluid communication with each of the respective oil outlets 140 and with the oil tank 142.

As described above, the separation chambers 102, 104, 180, 182, 184 are configured to induce a rotation of an air/oil mixture 120 to guide the lighter air toward an air outlet, e.g., a respective air channel 132, 134, 135, 136, 138 of each of the respective separation chambers 102, 104, 180, 182, 184. For example, the respective air portions 124 exit the separation chambers 102, 104, 180, 182, 184 to a respective air channel 132, 134, 135, 136, 138 and to the air outlet 130 of the air manifold 108.

In an exemplary aspect of the present disclosure, a method is provided for separating oil from air in a gas turbine engine. The method includes providing an air/oil separator having a first separation chamber and a second separation chamber separate from the first separation chamber; directing a first air/oil mixture to the first separation chamber; and simultaneously directing a second air/oil mixture to the second separation chamber.

Further aspects of the invention are provided by the subject matter of the following clauses:

1. A gas turbine engine, comprising: an oil circuit for providing oil to a system of the gas turbine engine; and an air/oil separator coupled to the oil circuit, comprising: an oil manifold having a first air/oil inlet and a second air/oil inlet; a first separation chamber in communication with the first air/oil inlet; and a second separation chamber separate from the first separation chamber, the second separation chamber in communication with the second air/oil inlet.

2. The gas turbine engine of any preceding clause, wherein the air/oil separator further comprises: an air manifold having an air outlet, wherein the first separation chamber is in communication with the air outlet, and wherein the second separation chamber is in communication with the air outlet.

3. The gas turbine engine of any preceding clause, wherein the first air/oil inlet is disposed tangentially along a wall of the first separation chamber and configured to receive a first air/oil mixture and induce a circular motion of the first air/oil mixture within the first separation chamber.

4. The gas turbine engine of any preceding clause, wherein a first oil portion exits the first separation chamber at a bottom location and wherein a first air portion exits the first separation chamber at a top location and flows to the air outlet of the air manifold.

5. The gas turbine engine of any preceding clause, wherein the oil circuit provides the oil to at least one of a power gear box, a pitch change mechanism for a variable pitch fan, and an electric machine.

6. The gas turbine engine of any preceding clause, wherein the second air/oil inlet is disposed tangentially along a wall of the second separation chamber and configured to receive a second air/oil mixture and induce a circular motion of the second air/oil mixture within the second separation chamber.

7. The gas turbine engine of any preceding clause, wherein a second oil portion exits the second separation chamber at a bottom location.

8. The gas turbine engine of any preceding clause, wherein a second air portion exits the second separation chamber at a top location and flows to the air outlet of the air manifold.

9. The gas turbine engine of any preceding clause, wherein the air/oil separator further comprises a third separation chamber separate from the first separation chamber and the second separation chamber.

10. The gas turbine engine of any preceding clause, wherein the oil manifold includes a third air/oil inlet, and the third separation chamber is in communication with the third air/oil inlet.

11. The gas turbine engine of any preceding clause, wherein the third separation chamber is in communication with the air outlet.

12. The gas turbine engine of any preceding clause, wherein the third air/oil inlet is disposed tangentially along a wall of the third separation chamber and configured to receive a third air/oil mixture and induce a circular motion of the third air/oil mixture within the third separation chamber.

13. A gas turbine engine, comprising: an oil circuit for providing oil to a system of the gas turbine engine; and an air/oil separator coupled to the oil circuit, comprising: an air manifold having an air outlet, a first separation chamber in communication with the air outlet; and a second separation chamber separate from the first separation chamber, the second separation chamber in communication with the air outlet.

14. The gas turbine engine of any preceding clause, wherein the air/oil separator further comprises an oil manifold having a first air/oil inlet and a second air/oil inlet; wherein the first separation chamber is in communication with the first air/oil inlet; and wherein the second separation chamber is in communication with the second air/oil inlet.

15. The gas turbine engine of any preceding clause, wherein the first air/oil inlet is disposed tangentially along a wall of the first separation chamber and configured to receive a first air/oil mixture and induce a circular motion of the first air/oil mixture within the first separation chamber.

16. The gas turbine engine of any preceding clause, wherein a first oil portion exits the first separation chamber at a bottom location, and wherein a first air portion exits the first separation chamber at a top location and flows to the air outlet of the air manifold.

17. The gas turbine engine of any preceding clause, wherein the second air/oil inlet is disposed tangentially along a wall of the second separation chamber and configured to receive a second air/oil mixture and induce a circular motion of the second air/oil mixture within the second separation chamber, wherein a second oil portion exits the second separation chamber at a bottom location, and wherein a second air portion exits the second separation chamber at a top location and flows to the air outlet of the air manifold.

18. A method of separating oil from air in a gas turbine engine, the method comprising: providing an air/oil separator having a first separation chamber and a second separation chamber separate from the first separation chamber; directing a first air/oil mixture to the first separation chamber; and simultaneously directing a second air/oil mixture to the second separation chamber.

19. The method of any preceding clause, wherein a first air/oil inlet is disposed tangentially along a wall of the first separation chamber and configured to receive the first air/oil mixture and induce a circular motion of the first air/oil mixture within the first separation chamber, wherein a first oil portion exits the first separation chamber at a bottom location, and wherein a first air portion exits the first separation chamber at a top location.

20. The method of any preceding clause, wherein a second air/oil inlet is disposed tangentially along a wall of the second separation chamber and configured to receive the second air/oil mixture and induce a circular motion of the second air/oil mixture within the second separation chamber, wherein a second oil portion exits the second separation chamber at a bottom location, and wherein a second air portion exits the second separation chamber at a top location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An air/oil separator, comprising:
    an air manifold having an air outlet and an air manifold centerline axis;
    an oil manifold having a first air/oil inlet and a second air/oil inlet, the oil manifold extending circumferentially about the air manifold centerline axis and an entirety of the oil manifold extending radially outward of the air manifold;
    a first rotating separation chamber defined by a first body, the first rotating separation chamber having a first rotating separation chamber bottom exiting hole and a first rotating separation chamber oil outlet channel fluidly coupled to the first rotating separation chamber bottom exiting hole, the first rotating separation chamber being in communication with the first air/oil inlet and the air outlet, and the first body being configured to induce a rotation of an air/oil mixture in the first rotating separation chamber to separate air of the air/oil mixture from oil of the air/oil mixture and to guide the air towards the air outlet and the oil towards the first rotating separation chamber bottom exiting hole; and
    a second rotating separation chamber defined by a second body, the second rotating separation chamber having a second rotating separation chamber bottom exiting hole and a second rotating separation chamber oil outlet channel fluidly coupled to the second rotating separation chamber bottom exiting hole, the second rotating separation chamber being separate from the first rotating separation chamber and in communication with the second air/oil inlet and the air outlet, and the second body being configured to induce a rotation of the air/oil mixture in the second rotating separation chamber to separate the air of the air/oil mixture from the oil of the air/oil mixture and to guide the air towards the air outlet and the oil towards the second rotating separation chamber bottom exiting hole,
    wherein the air manifold centerline axis is parallel to a centerline axis of the first rotating separation chamber bottom exiting hole or the second rotating separation chamber bottom exiting hole, and
    wherein the first rotating separation chamber oil outlet channel and the second rotating separation chamber oil outlet channel are separate and are each fluidly coupled between their respective bottom exiting hole and an oil tank.

2. The air/oil separator of claim 1, wherein the first air/oil inlet is disposed tangentially along a wall of the first rotating separation chamber and configured to receive a first air/oil mixture and induce a circular motion of the first air/oil mixture within the first rotating separation chamber.

3. The air/oil separator of claim 2, wherein a first oil portion exits the first rotating separation chamber through the first rotating separation chamber bottom exiting hole through the first rotating separation chamber oil outlet channel and to the oil tank.

4. The air/oil separator of claim 3, wherein a first air portion exits the first rotating separation chamber at a top location and flows to the air outlet of the air manifold.

5. The air/oil separator of claim 1, wherein the second air/oil inlet is disposed tangentially along a wall of the second rotating separation chamber and configured to receive a second air/oil mixture and induce a circular motion of the second air/oil mixture within the second rotating separation chamber.

6. The air/oil separator of claim 5, wherein a second oil portion exits the second rotating separation chamber through the second rotating separation chamber bottom exiting hole through the second rotating separation chamber oil outlet channel and to the oil tank.

7. The air/oil separator of claim 6, wherein a second air portion exits the second rotating separation chamber at a top location and flows to the air outlet of the air manifold.

8. The air/oil separator of claim 1, further comprising:
a third rotating separation chamber separate from the first rotating separation chamber and the second rotating separation chamber.

9. The air/oil separator of claim 8, wherein the oil manifold includes a third air/oil inlet, and the third rotating separation chamber is in communication with the third air/oil inlet.

10. A gas turbine engine comprising:
a compressor section configured to compress air flowing therethrough to provide a compressed air flow; and
a combustor configured to combust a mixture fuel and the compressed air flow to generate combustion products;
a turbine section having at least one turbine driven by the combustion products; and
the air/oil separator of claim 1.

11. The gas turbine engine of claim 10, further comprising:
an oil circuit coupled to the air/oil separator; and
at least one of a power gear box, a pitch change mechanism for a variable pitch fan, or an electric machine coupled to the oil circuit.

12. An air/oil separator, comprising:
an air manifold having an air outlet and an air manifold centerline axis;
an oil manifold having a first air/oil inlet and a second air/oil inlet, the oil manifold extending circumferentially about the air manifold centerline axis and an entirety of the oil manifold extending radially outward of the air manifold;
a first rotating separation chamber defined by a first body and being in communication with the air outlet and the first air/oil inlet, the first body being configured to induce a rotation of an air/oil mixture in the first rotating separation chamber to separate air of the air/oil mixture from oil of the air/oil mixture and to guide the air towards the air outlet; and
a second rotating separation chamber separate from the first rotating separation chamber, the second rotating separation chamber being defined by a second body_and in communication with the air outlet and the second air/oil inlet, the second body being configured to induce a rotation of the air/oil mixture in the second rotating separation chamber to separate the air of the air/oil mixture from the oil of the air/oil mixture and to guide the air towards the air outlet.

13. The air/oil separator of claim 12, wherein the first air/oil inlet is disposed tangentially along a wall of the first rotating separation chamber and configured to receive a first air/oil mixture and induce a circular motion of the first air/oil mixture within the first rotating separation chamber.

14. A method of separating oil from air, the method comprising:
providing the air/oil separator of claim 12;
directing a first air/oil mixture to the first rotating separation chamber; and
simultaneously directing a second air/oil mixture to the second rotating separation chamber.

15. The method of claim 14, wherein the first air/oil inlet is disposed tangentially along a wall of the first rotating separation chamber and configured to receive the first air/oil mixture and induce a circular motion of the first air/oil mixture within the first rotating separation chamber, wherein a first oil portion exits the first rotating separation chamber at a bottom location, and wherein a first air portion exits the first rotating separation chamber at a top location.

16. A gas turbine engine comprising:
a compressor section configured to compress air flowing therethrough to provide a compressed air flow; and
a combustor configured to combust a mixture fuel and the compressed air flow to generate combustion products;
a turbine section having at least one turbine driven by the combustion products;
an oil circuit for providing oil to a system of the gas turbine engine; and
the air/oil separator of claim 11 coupled to the oil circuit.

17. The gas turbine engine of claim 16, wherein the system is at least one of a power gear box, a pitch change mechanism for a variable pitch fan, or an electric machine coupled to the oil circuit.

18. The air/oil separator of claim 12, wherein the first rotating separation chamber has a first rotating separation chamber centerline axis and a first rotating separation chamber air channel and the second rotating separation chamber has a second rotating separation chamber centerline axis and a second rotating separation chamber air channel,
wherein the first rotating separation chamber centerline axis and the second rotating separation chamber centerline axis are parallel to and located radially outward of the air manifold centerline axis, and
wherein the first rotating separation chamber air channel extends radially inward from the first rotating separation chamber centerline axis toward the air manifold centerline axis and the second rotating separation chamber air channel extends radially inward from the second rotating separation chamber centerline axis toward the air manifold centerline axis.

\* \* \* \* \*